United States Patent
Frank

(10) Patent No.: US 6,968,761 B2
(45) Date of Patent: Nov. 29, 2005

(54) DEVICE FOR MACHINING THE ENDS OF PIPES

(75) Inventor: Andreas Frank, Hilzingen (DE)

(73) Assignee: Georg Fischer Rohrverbindungstechnik GmbH, Singen (DE)

( * ) Notice: Subject to any disclaimer, the term of this patent is extended or adjusted under 35 U.S.C. 154(b) by 0 days.

(21) Appl. No.: 10/413,009

(22) Filed: Apr. 14, 2003

(65) Prior Publication Data

US 2003/0192411 A1 Oct. 16, 2003

(30) Foreign Application Priority Data

Apr. 15, 2002 (DE) ................. 102 16 787

(51) Int. Cl.⁷ ............................................... B23B 5/16
(52) U.S. Cl. .................................. 82/113; 82/131
(58) Field of Search .................. 82/113, 131; 408/101, 408/102, 131; 30/96

(56) References Cited

U.S. PATENT DOCUMENTS

| | | | |
|---|---|---|---|
| 3,648,313 A | * | 3/1972 | Fohl ............................... 470/77 |
| 4,739,682 A | * | 4/1988 | Birkestrand .................. 82/113 |
| 4,825,543 A | * | 5/1989 | Thalmann et al. ............. 30/96 |
| 5,941,145 A | * | 8/1999 | Marshall et al. .............. 82/113 |

FOREIGN PATENT DOCUMENTS

| | | |
|---|---|---|
| DE | 1 963 230 | 6/1967 |
| DE | 83 26 984.3 | 9/1983 |

* cited by examiner

*Primary Examiner*—Willmon Fridie, Jr.
(74) *Attorney, Agent, or Firm*—Bachman & LaPointe, P.C.

(57) ABSTRACT

A device for machining the ends of pipes, having a clamping device (6) for clamping the pipe in place, having an outer ring (9) and a shaping insert (11), in which the shaping insert has two half-rings (12, 13), which are releasably and resiliently connected to one another by means of at least one screw (34) and at least one spring (35). The tool is particularly compact, clean, safe and easy to handle.

16 Claims, 5 Drawing Sheets

DEVICE FOR MACHINING THE ENDS OF PIPES

BACKGROUND OF THE INVENTION

The invention relates to a device for machining the ends of pipes, having a clamping device for clamping the pipe in place, having an outer ring and a shaping insert.

In piping work, the end faces of the pipe walls are machined before two pipe ends are welded together. The surfaces of the pipe walls which meet at the weld seam have to run precisely at right angles to the axis of the pipeline, must be free of burrs and must be planar. Depending on the type of weld seam, it may be necessary for the end faces to be beveled or rounded. Pipe-flattening and/or chamfering tools are used for this weld preparation work. At a building site, a large number of pipes with different diameters have to be machined as efficiently as possible.

U.S. Pat. No. 5,941,145 has disclosed a tool for machining pipe ends of the generic type. The clamping device for clamping the pipe end in place substantially comprises a continuous, outer mounting ring, a lower shaping insert in the shape of a half ring and an upper shaping insert in the shape of a half ring. The shaping inserts have an annular inner surface with an internal radius which corresponds to the external radius of the pipe which is to be machined. The outer surface of the upper shaping insert and the inner surface of the mounting ring are designed in such a manner that, in the clamped state, a sickle-shaped space is present between the mounting ring and the upper shaping insert. The shaping inserts are successively introduced into and secured in the mounting ring.

Working on the basis of this prior art, it is an object of the invention to provide a tool for machining the ends of pipes which can be matched as simply as possible to the different pipe diameters and has a structure which is as simple and compact as possible.

SUMMARY OF THE INVENTION

The object is achieved by a device for machining the ends of pipes, having a clamping device for clamping the pipe in place, having an outer ring and a shaping insert, in which the shaping insert has two half-rings, which are connected to one another by means of at least one screw and at least one spring.

It is advantageous for it to be possible for the pipe end to be clamped in place as gently and simply as possible during the machining. This is achieved by the fact that the half-rings are formed in symmetrical pairs with respect to a center line. The half-rings are supplied in pairs. A piece of metal is used to make a ring with an internal diameter which precisely matches the external diameter of the pipe which is to be machined. Then, this ring is halved along the center line. The half-rings are connected to one another by means of screws and are held under prestress by a spring. This significantly simplifies the insertion of the shaping insert into the outer ring of the machining tool. Incorrect pairings of two half-rings are avoided.

It is also advantageous for it to be possible for the pipe end to be clamped in place as simply and accurately as possible at right angles to the pipe line axis. This is achieved by the fact that at least one clamping screw for securing the shaping insert is arranged in the outer ring, and that the half-rings in the outer wall each have a recess for accommodating the clamping screw, the recesses being arranged on a center line which is perpendicular to the center line of the two half-rings. This is also achieved by the fact that the screws for connecting the half-rings are designed as precision shoulder screws. The precision shoulder screws have, over a considerable length of the screw shank, an external diameter which is accurately matched to the internal diameter of the bores provided for them in the half-rings, and in this way guide the half-rings as accurately as possible with respect to one another and effect the most accurate possible orientation of the shaping insert and pipe end with respect to the outer ring of the machining tool.

It is also advantageous for it to be possible for the machine tool to be driven by different drive motors. This is achieved by the fact that the tool has a coupling region with a coupling adapter for optionally coupling the machining tool to a differently designed drive motor. With a suitable coupling adapter, the machine can be driven both by a drilling machine, which is connected to the mains voltage, and by a rechargeable battery motor or a pneumatic or hydraulic motor.

Furthermore, it is also advantageous for it to be possible for the machine tool to be operated as safely as possible by the operator. This can be achieved by the fact that the tool has a protective strap which is arranged in a plane which is formed by the drive axis and a handle of the drive motor. The protective strap prevents the possibility of the tool being switched on undesirably, for example as a result of the switch being pressed against a table edge.

Furthermore, it is advantageous for the machine tool to have the shortest possible overall length. This is achieved by the fact that the feed control comprises a feed nut with internal screw thread, a feed ring with external screw thread, at least one driver pin and a slip ring, in which arrangement, to receive the driver pins, the feed ring and the slip ring have bores which, as seen in the axial direction, are formed half along the feed ring and the slip ring, and the feed nut substantially being of a length which results from the sum of the length of the feed ring and the length of the tool feed.

BRIEF DESCRIPTION OF THE DRAWINGS

An exemplary embodiment of the invention is described with reference to the figures, in which.

DETAILED DESCRIPTION

Figure 1:
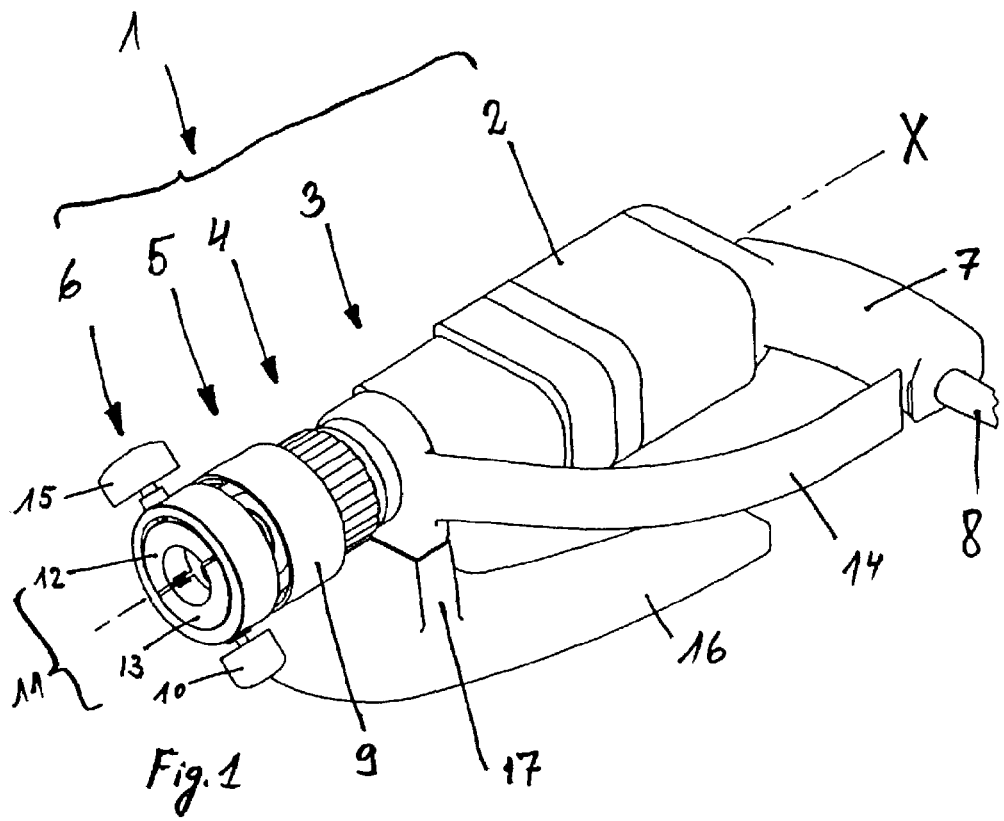
FIG. 1 shows a perspective view of a tool for machining the ends of pipes in accordance with the invention.

FIG. 1 shows a perspective view of a portable device or tool 1 for machining the ends of pipes. The tool 1 comprises, as seen from the back toward the front, a drive motor 2, a housing 3, a feed control 4, a working region 5 and a clamping device 6. The tool 1 has an axis X which coincides with the drive axis of the motor 2. In FIG. 1, a drilling tool with a handle 7 and a connection cable 8 is illustrated with the drive motor. In a commercially available drilling tool, the chuck for the drill bit can be unscrewed from the drive shaft and coupled to the housing 3. As an alternative to the drilling tool with the connection cable 8, it is also possible to have an electric motor which is powered by a storage battery, or a hydraulically or pneumatically driven motor, coupled to the housing 2.

The clamping device 6 comprises an outer ring 9, two clamping screws 10 and 15, which are arranged diametrically opposite one another in the outer ring 9, and a shaping insert 11, which has an internal diameter which precisely matches the external diameter of the pipe which is to be machined. A different shaping insert is supplied for each external diameter. The shaping insert comprises two half-rings 12, 13. The half-rings 12, 13 are produced and supplied in pairs and are formed symmetrically with respect to a center line Z.

A strap 14 is formed on the housing 3. The strap 14 runs from the housing 3 to the handle 7. The drive axis X of the motor 2, the handle 7 and the strap 14 form a plane A. A base plate 16 with a coupling socket 17 is indicated below the housing 3, parallel to this plane A. The tool 1 can be used with or without base plate as desired, i.e. can be used standing on a support or as a portable and hand-held tool. The protective strap 14 protects the region of the drilling tool in which the main switch is arranged. This ensures that the main switch cannot be switched on unintentionally. This would happen, for example, if the machine 1 were to be removed from the base plate 16 and pressed against a table edge in order to change the clamping device 6 or the tool.

Figure 2:
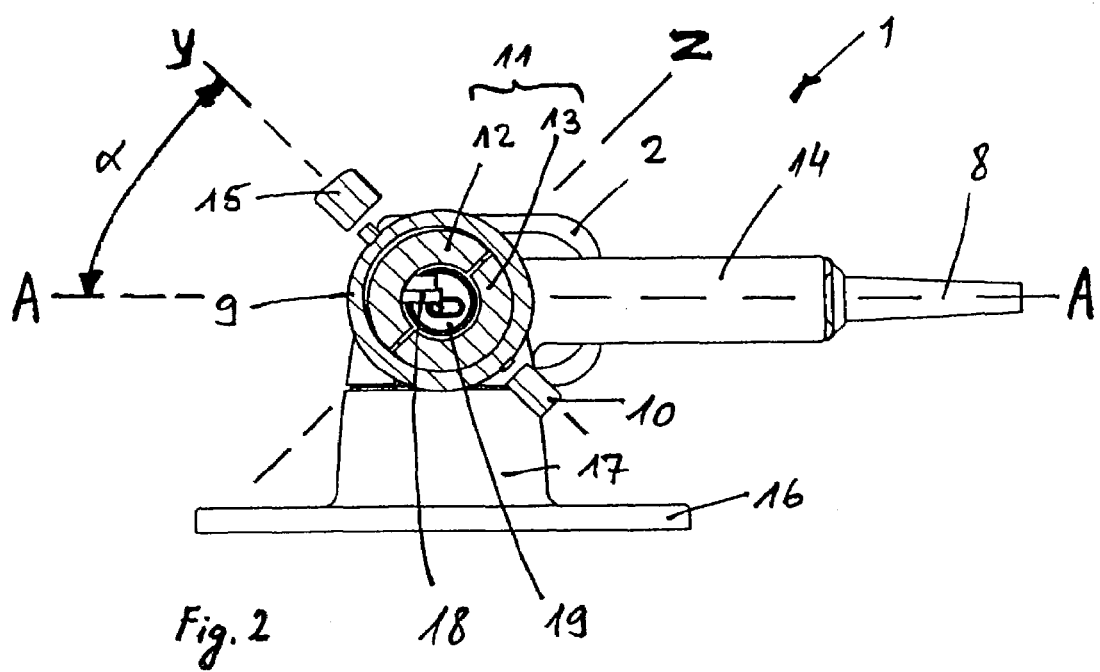
FIG. 2 shows a partially sectional view of the tool shown in FIG. 1.

FIG. 2 shows a further illustration of the tool shown in FIG. 1, seen in the direction of the drive axis X and, in the region of the clamping device 6, in section perpendicular to the drive axis X. In FIG. 2, the tool 1 is illustrated without a pipe, in order to make it easier to see a working tool 18 and a tool carrier 19.

Figure 3:
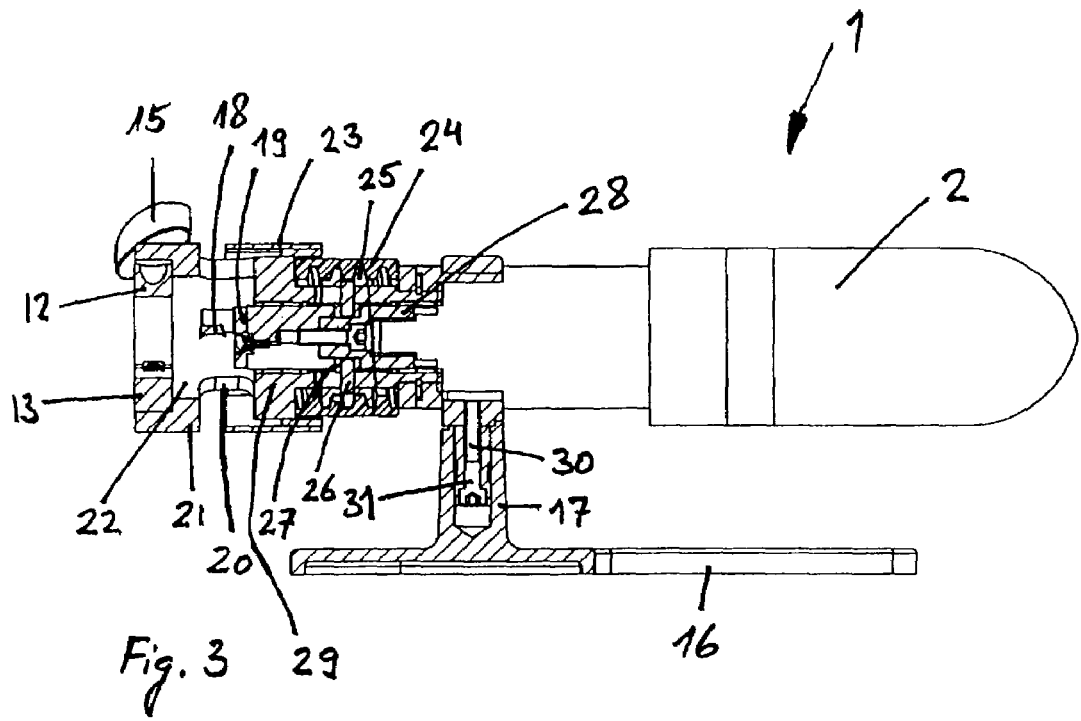
FIG. 3 shows a section through the tool shown in FIG. 1.

FIG. 3 shows a further illustration of the tool 1. In this case, the housing 3 is illustrated in section on the drive axis X and as seen from the plane A. In the working region 5, it is possible to see two apertures 20 at the housing 3, making it possible to see the working tool 18. The working tool 18 can be watched by the operator when it is being fitted to the tool carrier 19 and while the pipe-machining tool is operating. In this working region 5, the housing 1 substantially comprises a wall 21 which delimits a cylindrical chip chamber 22. In the operating state, that end of the pipe which is to be machined and the working tool 18 are located in the chip chamber 22.

The chip chamber 22 can be closed off by an axially displaceable chamber wall 23. The chamber wall 23 is substantially produced from a transparent material, for example polycarbonate or acrylic plastic. The result of this is that the chips which are formed when the tool is operating are collected. Because the chamber wall is transparent, it is nevertheless possible to observe the working tool 18 and the machining operation through the apertures 20 when the chamber 22 is closed. The chamber wall 23 can interact with a spring (no shown), in such a manner that, in the operating state, the chamber 22 is held in a closed position by the spring force. This also prevents the possibility of anything inadvertently being introduced into the working region of the chip chamber 22 through the apertures 20. This ensures both clean and safe working.

FIG. 3 also shows the feed mechanism for controlling the feed of the working tool. As seen from the outside inward, the feed control 4 comprises a feed nut 24, a feed ring 25, two driver pins 26 and a slip ring 27. On the inner side, the feed nut 24 has an internal screw thread which interacts with an external screw thread which is formed on the feed ring 25. The feed nut 24 is arranged in an annular recess in the outer wall of the housing 3. The feed nut itself cannot be displaced in the axial direction in this recess, but rather is merely arranged so that it can rotate in the radial direction. On the outer side, the feed nut has notches or an embossed structure in order to improve the grip when it is being actuated. The feed nut 24 is also provided with a scale which, together with a fixed reference mark on the housing 3, indicates the extent of the tool feed. The screw threads of the feed nut 24 and of the feed ring 25 can be designed as acme thread and have a small pitch, so that the feed control can be carried out in a nonpositively locking manner, reproducibly and as accurately as possible. The feed ring 25 is arranged in such a manner that it can be displaced in the axial direction but not rotated in the radial direction on the inner side of the feed nut 24 in the recess on the outer side of the housing 3.

In the feed ring 25 and in the slip ring 27 there are bores which each accommodate an end of the driver pin 26. The driver pin 26 is movable in a slot, running in the axial direction, in the housing wall. To provide good guidance for the slip ring 27, it is possible to provide two or more driver pins 26. The slip ring 27 is mounted on a drive spindle 28. A tool spindle 29, which on the front side bears the tool carrier 19 and the working tool 18, is also arranged on the same drive spindle 28. The axial movement of the driver pins 26 and of the slip ring 27 therefore effects an axial movement of the working tool 18, of the tool spindle 29 and of the drive spindle 28. The bores in the feed ring 25 and in the slip ring 27 are formed in the center, i.e. halfway along. The result of this is a uniform distribution of the forces which act on these parts during operation. The feed nut 24 has an overall length which is substantially no greater than the sum of the length of the feed ring 25 and of the length of the feed required for operation of the tool for machining pipe ends. In this way, the shortest possible overall length of the feed mechanism and therefore of the entire tool is ensured.

The ability of the moving parts of the feed mechanism to slide is increased by a surface treatment of the surfaces which rub against one another, for example a coating and/or a special surface hardening. In particular the feed nut 24, the feed ring 25, the drive spindle 28, the tool spindle 29 and the associated sliding-contact bearings are provided with a surface which is able to slide by being coated with a material which promotes sliding, such as for example polytetrafluoroethylene. This surface treatment allows the machine tool to operate entirely without lubricant. This contributes to clean working at the building site. Nothing has to be oiled or lubricated in the tool, and the working environment is not contaminated by drops of oil. FIG. 3 also shows how the drive spindle 28 is coupled to a spindle of the drive motor 2 at the rear end.

Figure 4:
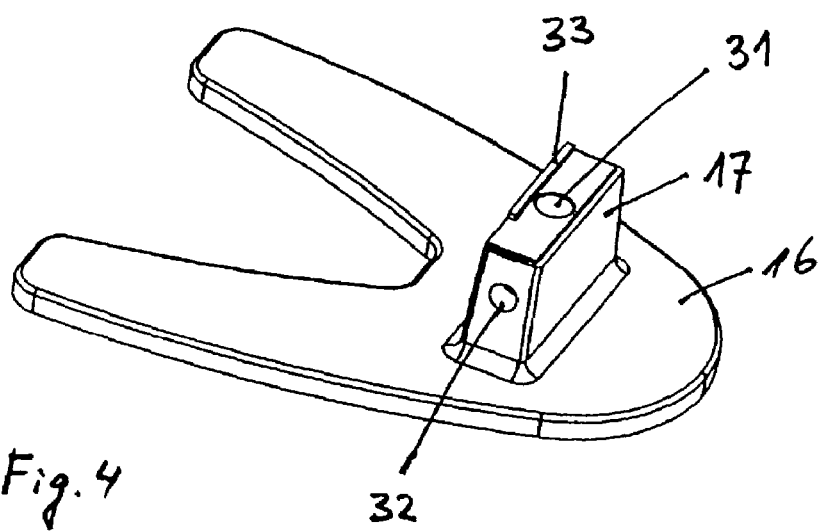
FIG. 4 shows a view of a base plate used for the tool shown in FIG. 1.

It can also be seen from FIG. 3, and more clearly from FIG. 4, how the housing 3 has a securing pin 30, which fits into a recess 31 in the pedestal 17 of the base plate 16, on the lower side. FIG. 4 also reveals a further bore 32 in the pedestal 17 for a securing screw. On the upper side, the pedestal 17 has an elevation 33 which serves as a stop and positioning aid for the tool on the pedestal 17. This ensures stable and reliable securing of the tool 1 to the base plate 16. The tool can quickly be detached from the base plate 16, since it is merely necessary to undo one screw.

Figure 5:
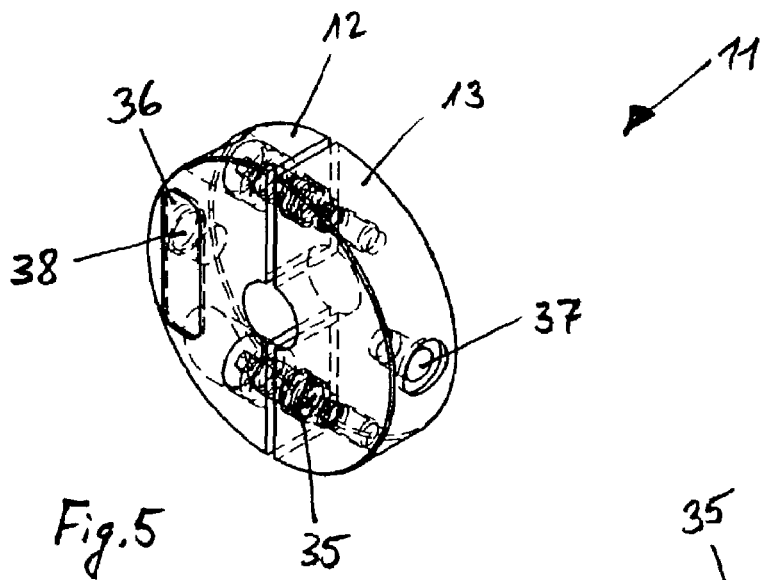
FIG. 5 shows a perspective view of a shaping insert used in the tool shown in FIG. 1.
Figure 6:
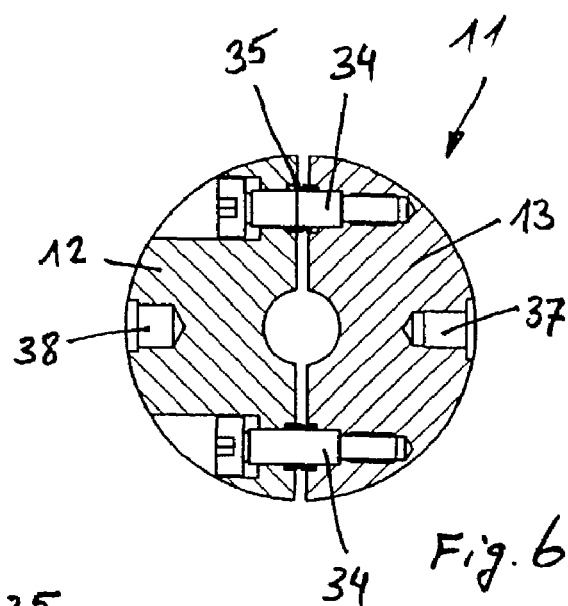
FIG. 6 shows a section through the shaping insert used in the tool shown in FIG. 5.
Figure 7:
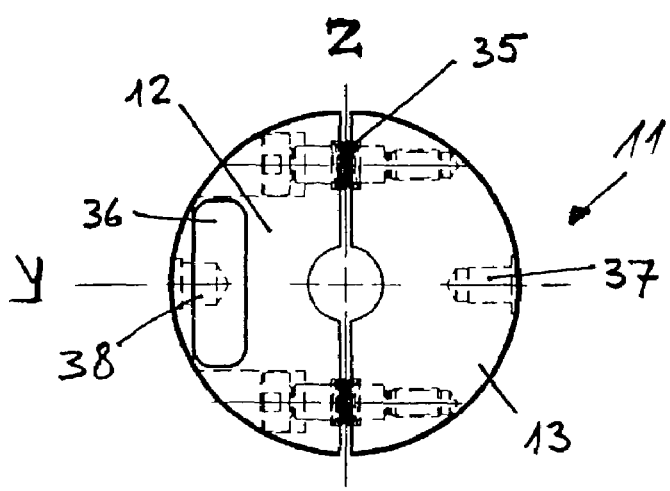
FIG. 7 shows a view of the shaping insert used in the tool shown in FIG. 5.

FIGS. 5, 6 and 7 show the shaping insert 11 all on its own. The shaping insert 11 comprises two half-rings 12, 13, which are held together by screws 34. The half-rings 12, 13 are made from one piece of metal and are separated by sawing along the center line Z. The screws 34 are designed as precision shoulder screws. The precision shoulder screws 34 fit accurately into the bores provided for them in the half-rings and in this way improve the guidance of the two half-rings 12, 13 with respect to one another. Springs 35 are arranged on the shoulders of the screws 34. The half-rings 12, 13 are assembled in pairs and are supplied in pairs together with the tool for machining the ends of pipes. The fact that the half-rings are produced in pairs ensures the highest possible level of precision and reproducibility in the clamping of pipes. One half-ring 12 has a recess 36 for an identification plate. The fact that the half-rings are produced in pairs also results in the most accurate possible matching of the internal diameter of the shaping insert 11 to the external diameter of the pipe which is to be machined. A matching shaping insert is supplied for each pipe external diameter. The fitting and removal of the shaping insert 11 at the building site is facilitated by the fact that the operator only has to fix one set of the shaping insert 11 which has been screwed together. Further cylindrical recesses 37, 38 are formed in each half-ring 12, 13 on opposite sides, perpendicular to the center axis Z. A clamping screw 10 is screwed through the outer ring 9 in the first recess 37 on the lower side of the clamping device 6. The first clamping screw 10 and the recess 37 in the first half-ring 13 have screw threads which match one another. On the upper side of the clamping device 6, the second recess 38 in the second half-ring 12 does not have a screw thread. The second screw 15 is introduced into this recess 38 without a screw thread. The second screw 15 is used primarily to transmit the compressive force to the shaping insert 11.

The center line Z between the half-rings 12, 13 runs at an angle of preferably 45° with respect to the plane of the base plate 16. Although arranging the center line Z perpendicular to the base plate 16 would be optimum with a view to uniform self-centering of the half-rings 12, 13 and for good accessibility of the clamping screws 10, 15, in this position the flanks of the screws 10, 15 would impede the view and accessibility of the working region 5. Arranging the center line Z horizontally with respect to the base plate 16 would make access to the lower screw 10 unnecessarily difficult and would influence the self-centering of the two half-rings 12, 13. In order, with the shortest possible length of the tool, to optimize both accessibility to the working region 5 and to the working tool 18 and accessibility to the clamping screws 10, 15 of the clamping device 6, it is advantageous for the center line Z to be arranged at an angle of approximately 45°.

Figure 8:
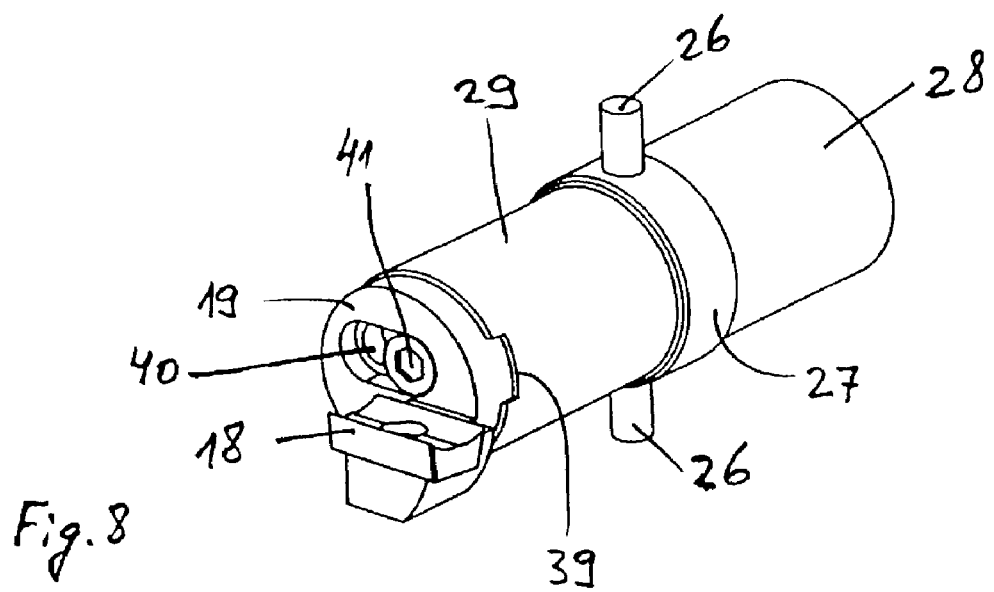
FIG. 8 shows a perspective view of an assembly of drive spindle and tool carrier used in the machine shown in FIG. 1.
Figure 9:
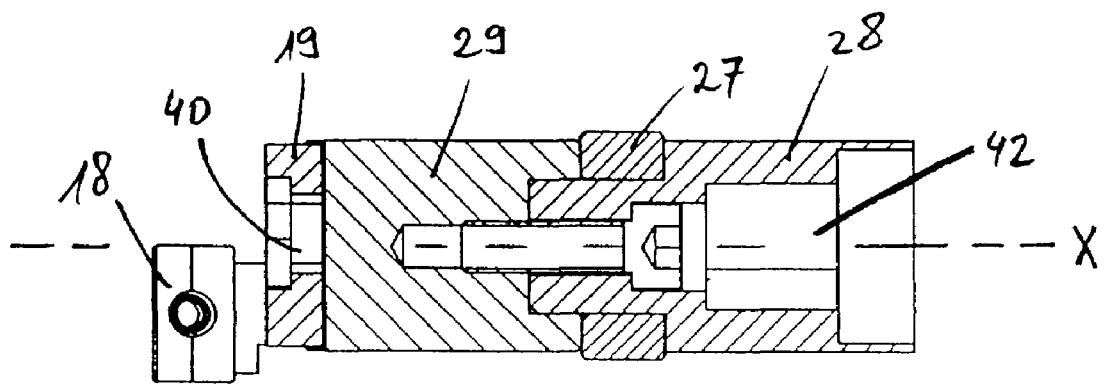
FIG. 9 shows a section through the assembly shown in FIG. 8.
Figure 10:
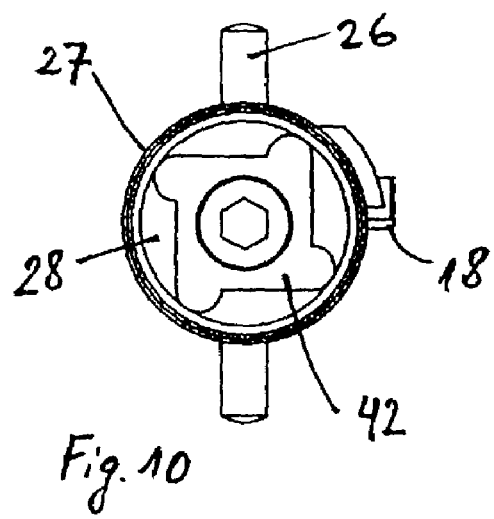
FIG. 10 shows a view of the assembly shown in FIG. 8.

FIGS. 8, 9 and 10 illustrate the combination of working tool 18, tool carrier 19, tool spindle 29 and drive spindle 28. The tool carrier 19 is arranged displaceably in a groove 39 in the front side of the tool spindle 29. The tool carrier 19 has an elongate aperture 40 in order to allow the tool carrier 19 to be displaced over the length of the aperture 40. The tool carrier 19 is secured to the tool spindle 29 by means of a screw 41 which is guided through the aperture 40. This continuous displaceability of the tool carrier 19 ensures that the working tool 18 can be utilized over its entire length. The working tool 18 itself is designed as what is known as a disposable tip with a plurality of cutting edges and can therefore be used a number of times by turning the sides.

Figure 11:
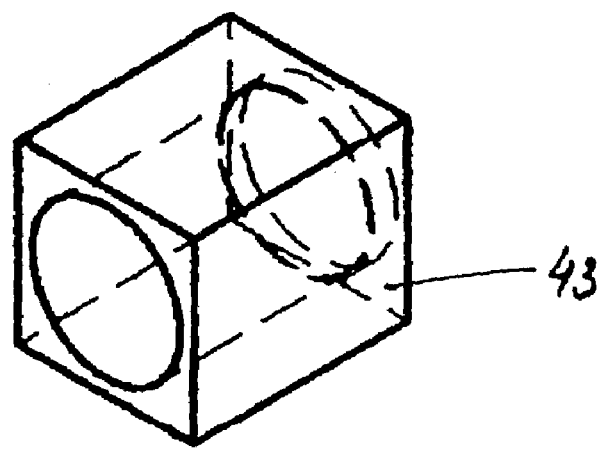
FIG. 11 shows a perspective view of a special nut.

FIG. 10 shows a view of the drive spindle 28 as seen in the direction of the drive axis X. On the side of the drive motor 2, the drive spindle 28 has a recess 42, into which a nut 43 made from brass, which is illustrated in FIG. 11, fits. The nut 43, which is screwed onto the drive shaft of the drive motor, and the recess 42 are in this case, by way of example, of square design, but may also be in the form of any other regular polygon. In the region of the nut 43, both the force from the motor is transmitted to the working tool and the axial feed of the working tool with respect to the drive shaft of the motor 2 is produced. The nut 43 in each case has an internal screw thread which matches the external screw thread of the drive shaft of the corresponding drive motor. The nut 43 is used to introduce the drive shaft of the drive motor as far as possible into the recess 42 and into the housing 3. This arrangement of nut 43 and recess 42 results in the shortest possible overall length of the housing 3.

Figure 12:
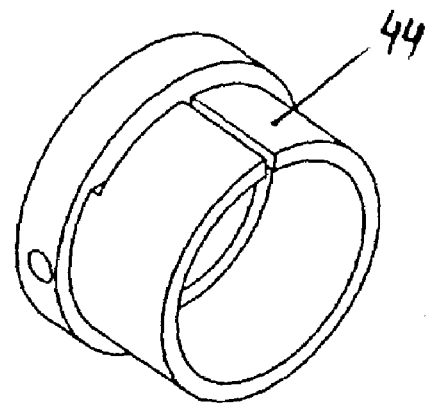
FIG. 12 shows a perspective view of an adapter ring used in the tool shown in FIG. 1.

FIG. 12 shows a perspective view of an adapter ring 44. The adapter ring can be arranged between the housing 3 and the drive motor 2 and is used mainly to adapt to the different diameters of the drive unit. By means of the adapter ring 44 and the special nut 43 which fits into the recess 42, the housing 3 can if necessary also be coupled to other drive motors, such as for example a battery-driven drill screwdriver or a hydraulically or pneumatically driven motor.

What is claimed is:

1. A device for machining the ends of pipes, comprises a clamping device (6) for clamping a pipe in place, the clamping device comprises an outer ring (9) and a shaping insert (11), the shaping insert comprises two half-rings (12, 13) wherein the half-rings (12, 13) are symmetrical pairs with respect to a center line Z, which are releasably and resiliently connected to one another by connection means comprising at least one screw (34) and at least one spring (35) wherein at least one clamping screw (10, 15) for securing the shaping insert (11) is arranged in the outer ring (9), and wherein the half-rings (12, 13) in the outer ring each have a recess (37, 38) for accommodating the clamping screw (10, 15), the recesses (37, 38) being arranged on a center line Y which is perpendicular to the center line Z of the two half-rings (12, 13).

2. A device for machining the ends of pipes, comprises a clamping device (6) for clamping a pipe in place, the clamping device comprises an outer ring (9) and a shaping insert (11), the shaping insert comprises two half-rings (12, 13), which are releasably and resiliently connected to one another by connection means comprising at least one screw (34) and at least one spring (35), and a protective strap (14) which is arranged in a plane A which is formed by a drive axis X and a handle (7) of a drive motor M.

3. A device for machining the ends of pipes, comprises a clamping device (6) for clamping a pipe in place, the clamping device comprises an outer ring (9) and a shaping insert (11), the shaping insert comprises two half-rings (12, 13), which are releasably and resiliently connected to one another by connection means comprising at least one screw (34) and at least one spring (35), and further including a housing (3), having a drive spindle (28), a feed control (4) and a tool carrier (19), the feed control being arranged between the drive spindle and the tool carrier, wherein the feed control (4) comprises a feed nut (24) with internal screw thread, a feed ring (25) with external screw thread, at least one driver pin (26) and a slip ring (27), wherein the feed ring and the slip ring have bores to receive the driver pins, and wherein the feed nut (24) is of a length which is the sum of the length of the feed ring (25) and the length of the tool feed.

4. A device for machining the ends of pipes, comprises a clamping device (6) for clamping a pipe in place, the clamping device comprises an outer ring (9) and a shaping insert (11), the shaping insert comprises two half-rings (12, 13), which are releasably and resiliently connected to one another by connection means comprising at least one screw (34) and at least one spring (35), further including a coupling region with a coupling adapter (44) for coupling a machining tool to a drive motor M and a chip chamber (22) adjacent the machining tool which is closed off by a chamber wall (23) which is displaceable in an axial direction.

5. A device for machining the ends of pipes, comprises a clamping device (6) for clamping a pipe in place, the clamping device comprises an outer ring (9) and a shaping insert (11), the shaping insert comprises two half-rings (12, 13), which are releasably and resiliently connected to one another by connection means comprising at least one screw (34) and at least one spring (35), a housing (3), having a drive spindle (28), a feed control (4) and a tool carrier (19), the feed control being arranged between the drive spindle and the tool carrier, wherein the tool carrier (19) is arranged in a displaceable manner in a groove (39) formed in an end side of an axially displaceable tool spindle (29).

6. A device for machining the ends of pipes, comprises a clamping device (6) for clamping a pipe in place, the clamping device comprises an outer ring (9) and a shaping insert (11), the shaping insert comprises two half-rings (12, 13), which are releasably and resiliently connected to one another by connection means comprising at least one screw (34) and at least one spring (35), and including a housing (3) having a securing pin (30) for releasably securing the device to a base plate (16).

7. The device for machining the ends of pipes as claimed in claim 1, wherein the half-rings (12, 13) are symmetrical pairs with respect to a center line Z.

8. The device for machining the ends of pipes as claimed in claim 2, further including a coupling region with a coupling adapter (44) for coupling a machining tool to a drive motor M.

9. The device for machining the ends of pipes as claimed in claim 1, wherein the center line Y on which the clamping screws (10, 15) are arranged forms an angle of preferably 45° with a plane A which is formed by a drive axis X and a handle (7) of a drive motor M.

10. The device for machining the ends of pipes as claimed in claim 2, further including a housing (3), having a drive spindle (28), a feed control (4) and a tool carrier (19), the feed control being arranged between the drive spindle and the tool carrier.

11. The device for machining the ends of pipes as claimed in claim 10, wherein the feed control (4) comprises a feed nut (24) with internal screw thread, a feed ring (25) with external screw thread, at least one driver pin (26) and a slip ring (27), wherein the feed ring and the slip ring have bores to receive the driver pins, and wherein the feed nut (24) is of a length which is the sum of the length of the feed ring (25) and the length of the tool feed.

12. The device for machining the ends of pipes as claimed in claim 11, wherein a surface of the feed control (4) includes a coating of polytetra-fluoroethylene.

13. The device for machining the ends of pipes as claimed in claim 8, further including a chip chamber (22) adjacent the machining tool which is closed off by a chamber wall (23) which is displaceable in an axial direction.

14. The device for machining the ends of pipes as claimed in claim 13, wherein the displaceable chamber wall (23) is formed from a transparent material.

15. The device for machining the ends of pipes as claimed in claim 10, wherein the tool carrier (19) is arranged in a displaceable manner in a groove (39) formed in an end side of an axially displaceable tool spindle (29).

16. The device for machining the ends of pipes as claimed in claim 1, including a housing (3) having a securing pin (30) for releasably securing the device to a base plate (16).

* * * * *